United States Patent
Haunstetter et al.

(10) Patent No.: US 8,167,076 B2
(45) Date of Patent: May 1, 2012

(54) MOTOR VEHICLE

(75) Inventors: Frank Haunstetter, Leonberg (DE); Rolf Schwarz, Ditzingen (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 0 days.

(21) Appl. No.: 12/939,626

(22) Filed: Nov. 4, 2010

(65) Prior Publication Data

US 2011/0100743 A1 May 5, 2011

(30) Foreign Application Priority Data

Nov. 4, 2009 (DE) .................. 10 2009 051 980

(51) Int. Cl.
  *B60R 21/34* (2011.01)
  *B62D 25/10* (2006.01)

(52) U.S. Cl. . 180/274; 180/69.2; 296/1.03; 296/187.04; 701/45

(58) Field of Classification Search ............... 180/69.2, 180/69.21, 232, 274; 296/35.2, 187.04, 193.11, 296/1.03; 293/107, 111; 701/45

See application file for complete search history.

(56) References Cited

U.S. PATENT DOCUMENTS

| | | | |
|---|---|---|---|
| 4,249,632 A * | 2/1981 | Lucchini et al. | 180/274 |
| 6,860,356 B2 * | 3/2005 | Peter | 180/274 |
| 7,506,716 B1 * | 3/2009 | Salmon et al. | 180/274 |
| 2009/0048734 A1 * | 2/2009 | Iwai et al. | 701/36 |

FOREIGN PATENT DOCUMENTS

| | | |
|---|---|---|
| DE | 100 21 143 | 10/2001 |
| DE | 10 2005 048 328 | 11/2006 |
| EP | 1153810 A2 * | 11/2001 |
| EP | 1 712 426 | 10/2006 |
| EP | 1 818 224 | 8/2007 |
| EP | 2 025 565 | 2/2009 |
| JP | 2006-224890 | 8/2006 |

OTHER PUBLICATIONS

Machine Translation of EP 1153810 A2.*
Machine Translation of JP 2006-224890.*

* cited by examiner

*Primary Examiner* — Joseph Rocca
(74) *Attorney, Agent, or Firm* — Gerald E. Hespos; Michael J. Porco

(57) ABSTRACT

A motor vehicle has an actuator device for raising a bonnet in an accident to minimize injury to a pedestrian. The actuator device has at least two actuators for raising the bonnet. A control unit activates actuators with a time delay. Alternatively, the actuators differ in power. The time delay between activating the actuators or the differing power of the actuators reduces vibration while raising the bonnet, thereby ensuring proper raising of the bonnet and enhancing protection to the pedestrian.

6 Claims, 1 Drawing Sheet

MOTOR VEHICLE

CROSS-REFERENCE TO RELATED APPLICATION

This application claims priority under 35 USC 119 to German Patent Application No. 10 2009 051 980.7 filed on Nov. 4, 2009, the entire contents of which are incorporated herein by reference.

BACKGROUND OF THE INVENTION

1. Field of the Invention

The invention relates to a motor vehicle with an actuator device for raising a bonnet or hood in an accident, and particularly an accident with a pedestrian. The invention also relates to a method for reducing consequences of an accident of a pedestrian with a motor vehicle.

2. Description of the Related Art

EP 2 025 565 A1 discloses a motor vehicle with an actuator device for raising a bonnet in an accident, such as an accident with a pedestrian. The actuator device has two actuators arranged at lateral sides of a rear end of the bonnet. A swinging-up action or vibration when adjusting the bonnet is difficult to control and a smoothing unit preferably is arranged in a joint of the actuator. The smoothing unit generates a counterforce during the adjustment of the bonnet, for example in an accident, and thereby has a positive influence on the vibration behaviour of the bonnet.

EP 1 712 426 A1 discloses a motor vehicle with an energy-absorbing body between an actuator and a lower side of the bonnet. The energy-absorbing body has a positive influence on the vibration behaviour of the bonnet during the adjustment operation.

EP 1 818 224 A1 discloses a motor vehicle with an absorption element that damps possible vibrations occurring during adjustment of the bonnet.

In general, it has been demonstrated in motor vehicles that a bonnet can swing up or vibrate during an adjustment in an accident in a manner so that a prescribed deformation distance cannot be ensured.

An object of the invention is to provide a motor vehicle that addresses the above-described problems and enhances safety.

SUMMARY OF THE INVENTION

The invention relates to an automobile with a bonnet or hood that has an actuator device designed to rapidly raise the bonnet or hood during an accident. The raised bonnet will have a greater deformation distance. As a result, a pedestrian should anticipate less severe injury upon impact with the bonnet.

Actuator devices of this type customarily have at least two identical laterally spaced actuators that act simultaneously for raising the bonnet. However, the actuators of the invention do not exert identical raising forces at the same time. Accordingly, the bonnet does not rise uniformly when the two actuators are activated. Surprisingly, the use of actuators that are not identical or out of phase with one another has been found to significantly reduce vibrations. As a result, the actuator device ensures a predefined deformation distance and achieves a predictable mitigation of the accident consequences.

The two actuators can be located at laterally spaced positions at the rear end of the bonnet with respect to the travel direction. The left and right actuators may be structurally identical, but may act with a time delay that has a positive influence on the vibration behavior of the bonnet.

Alternatively, the actuators may be activated substantially simultaneously during an accident, but differ in power. Accordingly, the left and right rear sides of the bonnet are raised at different speeds. The difference in power and speeds of the respective actuators also has been found to achieve the desired reduction in vibrations.

The desired effect of the invention can be achieved whether the bonnet is adjusted at the rear and/or at the front. Rather, the desired effect of the invention is based on having the activation timing or the activation power of the two actuators offset to achieve a slight phase shift or offset in the adjustment positions of the actuators.

The actuators can be triggered pyrotechnically or by a mechanical spring. Actuators that are triggered pyrotechnically are smaller and lighter than mechanical spring actuators. Additionally, explosive activation ensures a rapid raising of the bonnet in an accident with a pedestrian. By contrast, mechanical spring actuators permit purely mechanical triggering mechanisms that may be less susceptible to faults than an electronic activation device for igniting pyrotechnic charges in an actuator. Furthermore, mechanical spring actuators afford the great advantage of being able to be reset after triggering and do not require a complete interchange after being triggered. Thus, mechanical spring actuators reduce costs for servicing or repair after an accident.

Further important features and advantages of the invention emerge from the following drawings and from the associated description. Of course, the features mentioned above and those explained below can be used in the respectively stated combination, in different combinations or on their own without departing from the scope of the invention.

Preferred exemplary embodiments of the invention are illustrated in the drawings and are explained in more detail in the description below, wherein the same reference numbers refer to the same, similar or functionally identical components.

DETAILED DESCRIPTION OF THE PREFERRED EMBODIMENTS

Figure 1:
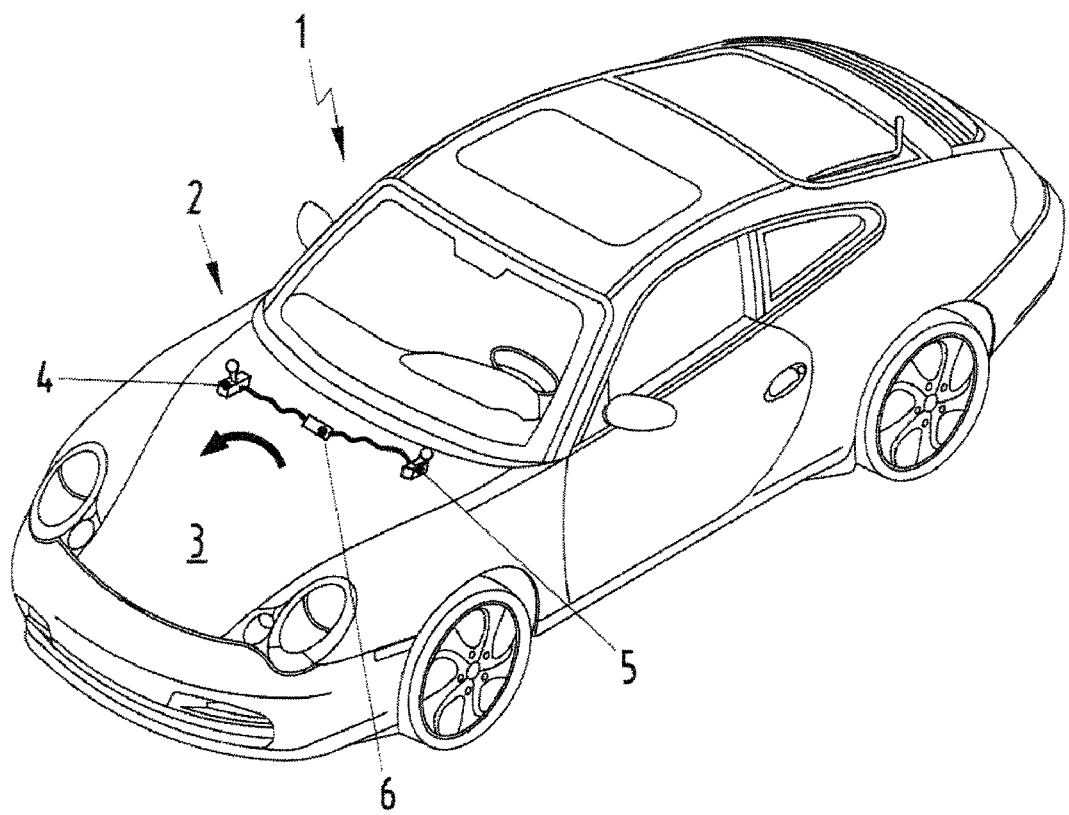
FIG. 1 is a perspective view of a motor vehicle according to the invention with a raisable front bonnet.

A motor vehicle 1 according to the invention is identified by the numeral 1 in FIG. 1. The motor vehicle 1 has an actuator device 2 for raising a rear end of a bonnet 3 during an accident, including an accident with a pedestrian. The actuator device 2 has two actuators 4 and 5 for raising the bonnet 3. A control unit 6 is provided for reducing a vibration behavior of the bonnet 3 during the raising operation and thereby reliably ensures that a predefined minimum amount of raising is achieved. The control unit 6 of a first embodiment activates the actuators 4, 5 in an accident with a time delay and thereby prevents uniform raising of the bonnet 3. The two actuators 4, 5 of the first embodiment may be of identical construction. However, the two actuators 4, 5 of a second embodiment may have different power. The differently powered actuators 4, 5 of the second embodiment will cause opposite sides of the rear end of the bonnet 3 to be raised at differing speeds even if the actuators are activated simultaneously by the control unit 6. The differently powered actuators 4, 5 similarly reduce the tendency of the bonnet 3 to vibrate during opening, and therefore reliably ensure that the bonnet reaches the required minimum amount of raising.

Two actuators 4, 5 are illustrated in FIG. 1. However, three or more actuators can be provided and each of the three or more actuators can differ in strength or can be triggered with a time delay.

The actuators 4, 5, can have a pyrotechnic, i.e. ignitable, charge or a mechanical spring as triggering mechanism. The pyrotechnic charges afford the great advantage of having a comparatively low weight, which is of great advantage particularly in the manufacturing of sports cars. By contrast, a mechanical spring permits the actuators to be reset after use, thus enabling the servicing and repair costs after an accident to be reduced.

The control unit 6 can activate the actuators 4, 5 in an accident with a time delay and can thereby raise the bonnet 3 with little vibration. Alternatively, the two actuators 4, 5 may be activated at the same time, but the actuators 4, 5 differ in power to reduce vibrations. In this second embodiment, the actuators 4, 5 may have pyrotechnic charges of differing power or springs of differing power.

The bonnet 3 in FIG. 1 is raised at the rear end, as seen in the direction of travel. The raised bonnet 3 defines an elastically flexible element that has a damping effect and can significantly reduce the consequences of an accident for pedestrians. The raised bonnet 3 significantly reduces the risk of severe head injuries for pedestrians.

Figure 2:
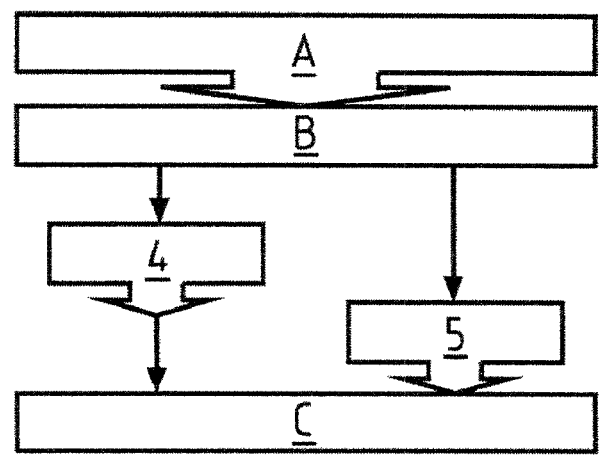
FIG. 2 schematically illustrates a method for reducing consequences of an accident.

The actuators 4, 5 also may be at least slightly simulated in a triggered state for at least partially absorbing the impact energy of a pedestrian acting on the bonnet 3. More, particularly, FIG. 2 illustrates a method for reducing consequences of an accident of a pedestrian with a motor vehicle. Method step A in FIG. 2 employs a sensor device to detect an approaching impact. Method step B utilizes the control unit, 6 to activate the two actuators 4, 5 of the actuator device 2. In this case, the arrows illustrated between the individual actuators 4 and 5 and method step B differ in length to illustrate a time-delayed triggering of the actuators 4, 5. More particularly, the actuator 4 in FIG. 2 is activated before the actuator 5 by a selected time delay. In method step C, the two actuators 4, 5 have finished the work of raising the bonnet 3 and provide an effective protection system for pedestrians to reduce the consequences of an accident.

Actuators 4, 5 that differ in power may be used in FIG. 2 and may be activated at the same time in method step B because the differing power of the actuators 4, 5 results in a non uniform raising of the bonnet 3.

The two alternate embodiments permit the bonnet 3 to be raised with low vibration so that the bonnet can reliably and safely reaches a predefined minimum amount of raising. Ensuring the amount of raising of the bonnet 3 substantially reduces the consequences of an accident of pedestrians with motor vehicles.

What is claimed is:

1. A motor vehicle for reducing consequences of injuries to a pedestrian in an accident with the motor vehicle, the motor vehicle comprising:
   a bonnet;
   an actuator device having at least two actuators for raising the bonnet in an accident; and
   a control unit for activating the actuators, the control unit and the actuators being configured so that the actuators are activated with different power for reducing vibration during the raising of the bonnet during an accident,
   wherein the actuators having different power have pyrotechnic charges differing in power or springs differing in power.

2. The motor vehicle of claim 1, wherein the actuators comprise a first actuator in proximity to a right side of the bonnet and a second actuator in proximity to a left side of the bonnet.

3. The motor vehicle claim 1, wherein the actuators are at an end of a bonnet relative to a direction of travel of the motor vehicle.

4. A method for reducing consequences of an accident of a pedestrian with a motor vehicle, the motor vehicle having a bonnet in proximity to a front end of the motor vehicle and first and second actuators in proximity to opposite first and second lateral sides of the bonnet for raising one end of the bonnet, the method comprising:
   detecting an impending impact with the front end of the motor vehicle;
   activating the first actuator for raising one end of the bonnet in proximity to the first lateral side of the bonnet at a first speed; and
   actuating the second actuator simultaneously with actuating the first actuator for raising the one end of the bonnet in proximity to the second lateral side of the bonnet at a second speed that is different than the first speed, whereby the different speeds for raising the bonnet at the first and second lateral sides of the bonnet avoids excessive vibrations during the raising of the one end of the bonnet.

5. The method of claim 4, wherein the motor vehicle has a controller and wherein the first and second actuators are pyrotechnic actuators, the method further comprising using the controller to ignite the first and second pyrotechnic actuators after detecting the impending impact.

6. The method of claim 4, wherein the raising of the one end of the bonnet comprises raising a rear end of the bonnet with respect to a direction of travel of the motor vehicle.

* * * * *